UNITED STATES PATENT OFFICE.

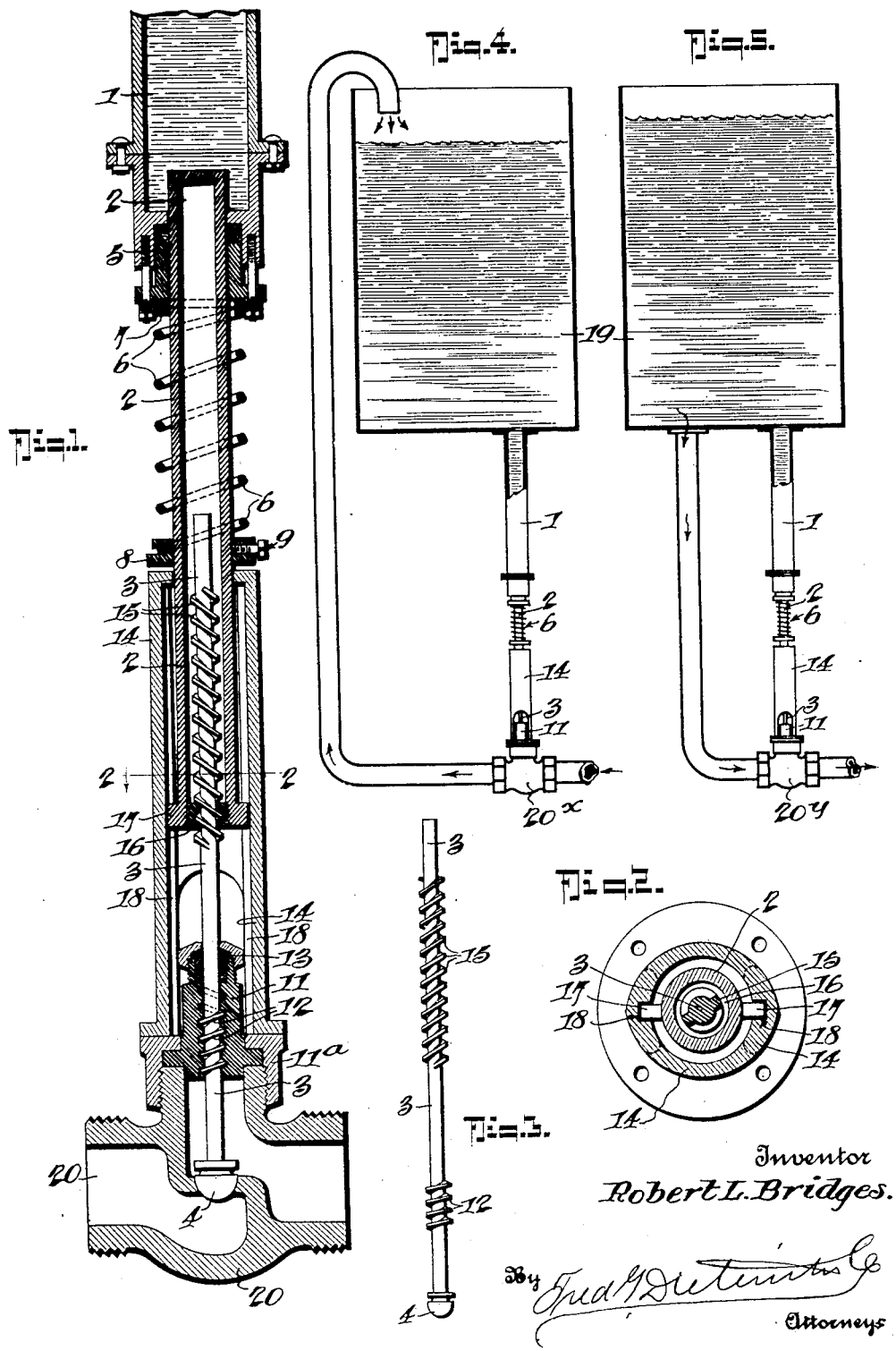

ROBERT LEE BRIDGES, OF LAKE CHARLES, LOUISIANA.

ROTARY AUTOMATIC VALVE-CONTROLLING MECHANISM.

1,387,760. Specification of Letters Patent. Patented Aug. 16, 1921.

Application filed August 16, 1919, Serial No. 317,959. Renewed June 28, 1921. Serial No. 481,166.

*To all whom it may concern:*

Be it known that I, ROBERT L. BRIDGES, a citizen of the United States, residing at Lake Charles, in the parish of Calcasieu and State of Louisiana, have invented a new and useful Rotary Automatic Valve-Controlling Mechanism, of which the following is a specification.

My invention primarily relates to an automatic valve controlling mechanism for the purpose of operating a steam or other valve by liquid gravity pressure, or to operate a valve controlling a steam pump, with liquid gravity pressure, to maintain a constant height of liquid in a tank, or in several or a group of tanks.

In its general nature, the invention comprises a valve having a stem adapted to be rotated to open and close the valve combined with a liquid pressure mechanism operating on the valve stem for turning the stem to close and open the valve according to the liquid pressure being applied to the said device.

In its more subordinate nature, the invention includes those novel details of construction, combination and arrangement of parts all of which will be first fully described, then be specifically pointed out in the appended claims, and illustrated in the accompanying drawing, in which:

Figure 1 is a vertical longitudinal section of the invention.

Fig. 2 is a transverse section of the same on the line 2—2 of Fig. 1.

Fig. 3 is a detail side elevation of the valve stem showing the modified construction.

Fig. 4 is a diagrammatic view illustrating an additional use of the invention for controlling valves in fluid ducts through which the fluid is pumped to a tank to fill the same.

Fig. 5 is another diagrammatic view showing the application of the invention to the controlling of outflow ducts for delivering the liquid out of the tank to maintain a constant level of fluid in the tank.

In the drawings, like numerals of reference indicate like parts in all of the figures. 1 represents the pipe or cylinder which contains the liquid which forces the plunger 2 downwardly against the action of the retracting spring 6. 3 designates the stem of the valve, the valve proper 4 being of any conventional design, as is also the valve case 20. The valve stem 3 is provided with the usual threads 12 to engage the threads of the neck 11 so that as the stem is turned in one direction or the other the valve 4 will be seated or unseated accordingly. The plunger 2 passes into the cylinder 1 through a gland 5 and the spring 6 is fastened at one end by a clamp 7 to the gland while its other end is secured to a collar 8 which is adjustably fastened to the plunger 2 by a set screw 9 or other suitable means. The neck 10 of the valve case 20 may be threaded to receive the clamp member or collar 11$^a$, which secures the neck 11 to the valve case 20 and it is to the collar 11 that the guide 14 is suitably fastened.

13 is the usual gland through which the valve stem 3 passes in a steam-tight or fluid-tight manner. The guide 14 is grooved vertically at 18 for the lugs 17 on the plunger 2 so as to prevent rotation of the plunger 2 with relation to the guide 14 and the valve casing.

The stem 3 is extended above the neck 11 and provided with quick pitch threads 15 that coöperate with a nut member 16 carried by the plunger 2 so that as the plunger 2 is moved up and down, the stem 3 will be turned to open and close the valve. In practice, when the invention is employed to control the action of a steam valve that controls the steam pump which delivers the liquid to the reservoir the valve mechanism 4—20 is of the usual steam valve type and is connected in the steam line in the usual way. When it is desired that the valve 4 be closed when the liquid level of the tank rises above a certain predetermined place, the threads 15 are so pitched that when the plunger 2 moves downwardly under the influence of the liquid pressure, the rotation of the stem 3 will be such as to screw it down and seat the valve 4. Conversely, as the pressure of the tank is reduced by the removal of the liquid contents so that it falls below the predetermined place, the spring 6 will retract the plunger 2 upwardly and thus impart a reverse rotation to the stem 3 and again open the valve 4, thereby permitting the pump to be again operated.

While I have designed my invention especially for the control of steam valves as stated, I wish it understood that I do not limit myself to such use as it is quite obvious that the control may be used on other valves for other purposes. For example, the control may be used to operate a water valve mechanism 20ˣ, as shown in Fig. 4, the arrangement being such that on the liquid in the tank 19 arriving at the predetermined level, the valve mechanism 20ˣ will be closed and as the liquid is removed from the tank (in any desired way) and falls below the predetermined level the valve mechanism 20ˣ will be open and allow the liquid to be again pumped into the reservoir or tank.

If it is desired that the mechanism control an outflow valve or safety valve from a liquid tank or reservoir, the arrangement shown in Fig. 5 may be employed. Assume the liquid is delivered into the reservoir 19 in any desired way from a more or less constant source of supply and it is desired that the level of the liquid in the tank be maintained at a predetermined place, the valve 20ʸ may be provided with the arrangement of the threads in such manner, for instance, as shown in Fig. 3. On the downward movement of the plunger 2 the valve 4 in the case 20ʸ (not shown) will be raised from its seat to allow the contents of the tank to flow out until the required level has been reached when the action of the spring 6 will restore the valve to its seat and close off the outflow passage.

Figs. 4 and 5 are mere diagrammatic views intended to illustrate the fact that the invention is not limited to any specific use, although it has been especially designed and is particularly useful for controlling steam valves as before stated.

From the foregoing description, taken in connection with the accompanying drawings, it is thought the complete construction, operation and advantages of the invention will be readily understood by those skilled in the art.

What I claim is:—

1. In an apparatus of the class described, the combination with a reservoir, a valve for controlling passage of fluid with regard to the reservoir, a valve stem adapted to be rotated to open and close the valve, a tubular plunger projected into said reservoir and having a direct screw connection with said valve stem and adapted to be forced in one direction by the pressure of the fluid in the reservoir to effect a closure of the valve, and a spring for forcing said tubular plunger in the opposite direction when the pressure of the fluid in the reservoir is less than the pressure of the spring.

2. In combination with a valve mechanism including a rotary valve stem and means for moving said stem longitudinally as the same is turned, a fluid containing cylinder, a hollow plunger projected into said cylinder and adapted to be moved in one direction by the pressure of the fluid within the cylinder, means for moving said plunger in the opposite direction when the pressure of the fluid is reduced, said valve stem projecting into said hollow plunger and a power translating connection between said plunger and said valve stem for rotating the valve stem as the plunger is reciprocated.

3. In a mechanism of the character described the combination with a valve including a stem and a threaded connection between the stem and the valve casing whereby when the stem is turned the valve will be seated or unseated, of a reciprocating plunger, a threaded connection between said plunger and said valve stem whereby when said plunger is reciprocated said valve stem will be turned to open and close the valve, mechanical means for moving said plunger in one direction, and fluid pressure operated means for moving said plunger in the opposite direction.

4. In combination with a rotary stem of a valve and a threaded connection between the stem and the neck of the valve casing whereby the stem is moved longitudinally when it is turned; of a guide, a plunger sustained in said guide for reciprocating motion, a threaded connection between said plunger and said valve stem whereby when said plunger is reciprocated said valve stem will be rotated in one direction or the other according to the direction of movement of said plunger, a cylinder to contain fluid, said plunger projecting into said cylinder and adapted to be moved in one direction by the pressure of the fluid within the cylinder, a spring, one end of which is fixed and the other end is connected to said plunger for moving said plunger in a direction opposite to that under which it moves by the influence of the pressure of the liquid.

5. In combination with a rotary stem of a valve and a threaded connection between the stem and the neck of the valve casing whereby the stem is moved longitudinally when it is turned; of a guide, a plunger sustained in said guide for reciprocating motion, a threaded connection between said plunger and said valve stem whereby when said plunger is reciprocated said valve stem will be rotated in one direction or the other according to the direction of movement of said plunger, a cylinder to contain fluid, said plunger projecting into said cylinder and adapted to be moved in one direction by the pressure of the fluid within the cylinder, a spring, one end of which is fixed and the other end is connected to said plunger for moving said plunger in a direction opposite to that under which it moves by the influence of the pressure of the liquid, and means for adjustably securing the spring to said plunger whereby the effective action of the spring may be varied as desired.

ROBERT LEE BRIDGES.